United States Patent [19]

Fuchs, Jr.

[11] 4,040,284
[45] Aug. 9, 1977

[54] PRESSURE VESSELS
[75] Inventor: Francis Joseph Fuchs, Jr., Princeton Junction, N.J.
[73] Assignee: Western Electric Co., Inc., New York, N.Y.
[21] Appl. No.: 716,492
[22] Filed: Aug. 23, 1976
[51] Int. Cl.² .................... B21C 27/00; B23P 11/00
[52] U.S. Cl. ...................... 72/272; 29/446; 220/3; 425/192 R; 72/DIG. 15
[58] Field of Search ............ 72/272, DIG. 15; 29/446, 447; 220/3; 425/192

[56] References Cited
U.S. PATENT DOCUMENTS

| | | | |
|---|---|---|---|
| 2,360,391 | 10/1944 | Birchall | 220/3 |
| 3,008,220 | 11/1961 | Sammarco | 29/446 |
| 3,256,069 | 6/1966 | Peterson | 220/3 |
| 3,433,382 | 3/1969 | Boggio | 29/446 X |
| 3,559,436 | 2/1971 | Nilsson | 72/272 |
| 3,762,448 | 10/1973 | Donohue | 220/3 |
| 3,918,288 | 11/1975 | Verduzco | 72/467 |

Primary Examiner—C.W. Lanham
Assistant Examiner—D. M. Gurley
Attorney, Agent, or Firm—A. S. Rosen

[57] ABSTRACT

A pressure vessel for containing fluid at very high pressures is formed from an axially aligned array or stack of like, flexible, relatively thin, dished discs, i.e., Belleville springs. The discs are clamped together axially, so as to flatten them into a pressure vessel wall structure which is pre-stressed in hoop compression along a bore formed by the aligned inner peripheries of the discs, and in hoop tension along the aligned outer peripheries of the discs. Such pre-stress pattern is particularly well adapted to permit the pressure vessel to support very high fluid pressures within the pressure vessel bore. A liner tube may be located within the bore formed by the aligned inner peripheries of the discs, while any suitable end closing mechanisms, e.g., a die assembly and a piston, may be employed to close the axially opposite ends of the pressure vessel bore.

14 Claims, 5 Drawing Figures

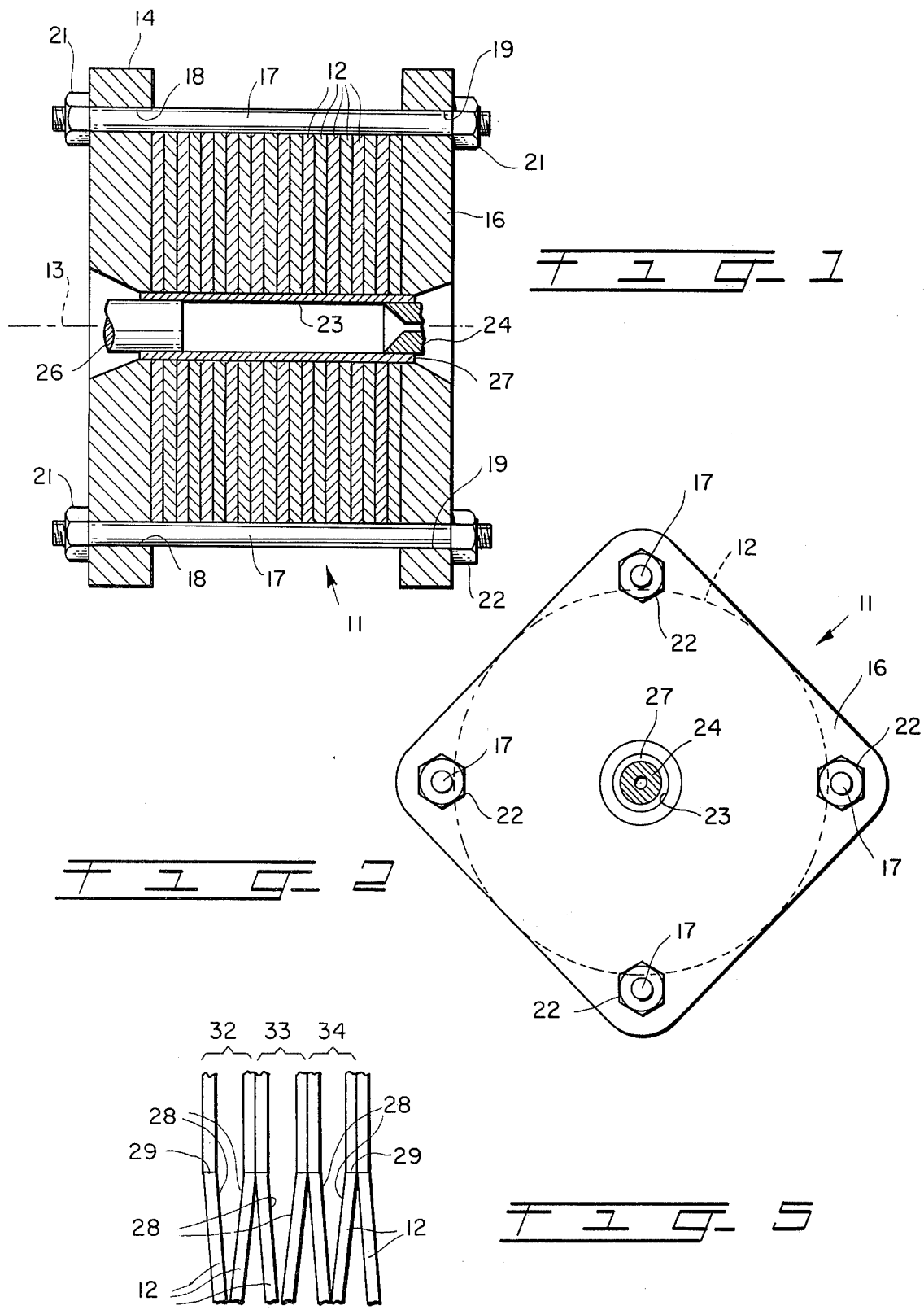

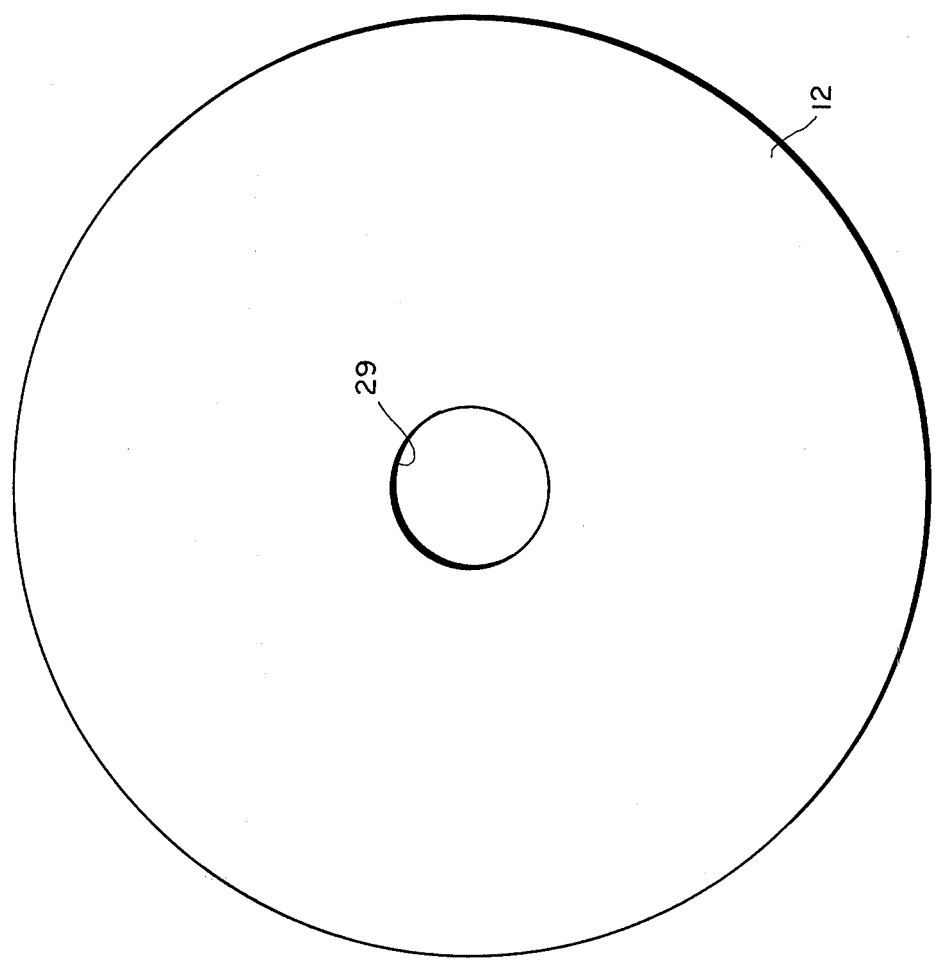
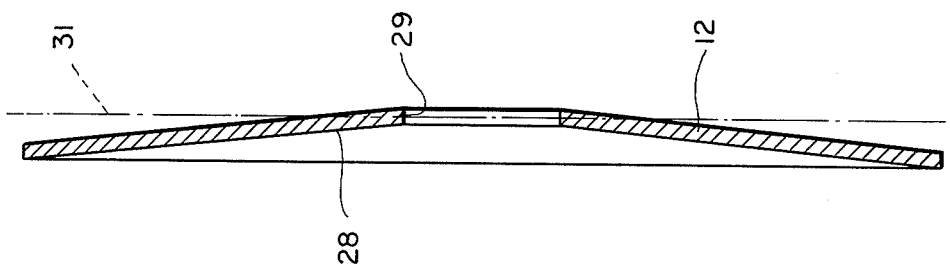

4,040,284

PRESSURE VESSELS

BACKGROUND OF THE INVENTION

1. Field of the Invention

This invention relates to pressure vessels and, more particularly, to pressure vessels for containing fluids at very high pressures.

2. Description of the Prior Art

Vessels for containing fluids, at elevated pressure levels, are known. For example, U.S. Pat. No. 3,256,069 to O. A. Peterson discloses a pressure vessel structure which includes an inner vessel surrounded by a plurality of axially stacked, annular plates. The annular plates are clamped together by tie rods which extend axially through aligned bores in the plates, with nuts threaded onto the opposite ends of each tie rod. The inner walls of the annular plates closely surround the outer surface of the inner vessel and serve to reinforce the walls of the inner vessel, such that a fluid pressure of up to about 15,000 p.s.i. may be supported within the inner vessel.

Another prior art pressure vessel is disclosed in U.S. Pat. No. 3,278,993 to J. Brayman et al., and is said therein to be capable of supporting very high fluid pressures, e.g., 400,000 psi. In the Brayman et al. pressure vessel, a thin inner tube is surrounded by a cylindrical liner, composed of soft material, which is itself surrounded by a segmented outer support cylinder formed by a plurality of axially stacked ring layers. Each ring layer includes a plurality of arcuate ring sectors, with the sectors of adjacent rings angularly offset from one another. Several pins pass axially through aligned bores in adjacent, angularly offset sectors in order to interconnect the sectors into an integral assembly. The pin structure may also serve to clamp the ring layers axially together by utilizing pins which pass axially through the entire set of ring layers, and providing nuts, threaded onto the outer ends of the pins, to apply the necessary clamping force. Alternatively, external clamping bolts may be employed in addition to the interconnecting pins.

A further prior art pressure vessel is disclosed in U.S. Pat. No. 3,433,382 to F. G. Boggio, the Boggio patent and the previously mentioned Brayman et al. patent having been assigned to a common assignee. The Boggio patent indicates that the thin inner tube of the Brayman et al. pressure vessel is subject to failure under pressure. This problem is addressed in the Boggio pressure vessel by providing a structure wherein a liner tube is surrounded by a segmented outer support cylinder similar to the segmented outer support cylinder of the Brayman et al. pressure vessel, and wherein suitable additional mechanisms are employed to produce hoop tension stresses in the outer support cylinder and simultaneous hoop compression stresses in the liner tube, prior to introducing very high pressure fluid into the pressure vessel. The Boggio patent suggests some examples of mechanisms for pre-stressing the outer support cylinder and the liner tube in the described manner during assembly of the pressure vessel. In particular, a slight axial taper may be formed in the liner tube, and the tapering liner tube may thereafter be driven axially into the bore of the outer support cylinder. Alternatively, one or more wedges may be driven into appropriate slots in a hollow, cylindrical member positioned between the liner tube and the outer support cylinder.

The structure described in the Boggio patent, as in true also with respect to the structure described in the Brayman et al. patent when functioning properly, is capable of containing pressures significantly higher than those possible in the Peterson structure. However, the Boggio and Brayman et al. structures are considered relatively complex, and relatively costly to manufacture and assemble. Accordingly, the provision of a simple and relatively inexpensive, yet durable, pressure vessel configuration, capable of containing fluids at very high pressures, would clearly be desirable.

SUMMARY OF THE INVENTION

The invention contemplates the provision of a relatively simple and inexpensive, yet durable, pressure vessel, capable of containing fluids at very high pressures, by forming a wall structure for the pressure vessel out of an array of like, flexible, relatively thin, dished, generally annular elements or discs, i.e., Belleville springs, each including a concave surface. The discs are stacked or arrayed in an axially extending line, e.g., either horizontally or vertically, preferably with adjacent discs paired such that the concave surfaces of each disc of a pair face one another. An axial compressive force is applied to the array of discs, for example, by forcing together axially two end members, each located at a different axial end of the array of discs, through the use of suitable clamping mechanisms. Thus, the discs are flattened into a substantially parallel-extending configuration, with each individual disc being pre-stressed in such manner as to produce hoop tension along the outer periphery of the disc and hoop compression along the inner periphery of the disc. The resulting, desirable stress pattern is similar to that provided by the previously described Boggio pressure vessel in separate components, i.e., hoop compression in the Boggio liner tube and hoop tension in the Boggio outer support cylinder. The structure for attaining such stress pattern is, however, much less complex through the use of the pre-stressed discs, as disclosed herein, than in the case of the Boggio pressure vessel.

The axially opposite, open ends of the bore of the array of the pre-stressed discs may be closed by any suitable mechanisms. For example, in order to provide a pressure chamber useful in the hydrostatic extrusion of metallic products, a die assembly may be located toward one axial end of the bore, and a piston may be located toward the opposite axial end of the bore, with the piston being relatively movable in the bore toward and away from the die assembly. In addition, a liner tube, similar to those employed in the previously discussed prior art pressure vessels, may be disposed within the bore formed by the array of compressed discs, being located radially outwardly of the die assembly and the piston if these are employed as the end closing mechanisms. Such a liner tube may be useful in assuring that the pressure vessel wall structure is adequately sealed against any loss of high pressure fluid between the individual discs of the array.

BRIEF DESCRIPTION OF THE DRAWINGS

FIGS. 1 and 2 of the drawing are, respectively, a longitudinal side view, partly in section, and an axial end view of a pressure vessel constructed in accordance with the principles of the invention and capable of containing very high fluid pressures;

FIGS. 3 and 4 are, respectively, a longitudinal side view and an axial end view of one of a number of flexible, dished, relatively thin, generally annular elements or discs which together form a wall structure of the pressure vessel of FIGS. 1 and 2; and FIG. 5 is an enlarged longitudinal side view of a portion of the pressure vessel shown in FIG. 1, illustrating a preferred arrangement for the individual discs during the course of assembling the pressure vessel.

DETAILED DESCRIPTION

Referring initially to FIGS. 1 and 2 of the drawing, a pressure vessel 11 includes a wall structure formed by a number of like, generally annular elements or discs 12. The discs 12 are arranged in an in-line array, extending in an axial direction, i.e., with the flat faces of the discs 12 extending along parallel radial planes, and with the central axes of the discs 12 extending along a common axial line 13. A pair of end blocks 14 and 16 cooperate with a number of tie rods 17, which pass through aligned pairs of apertures 18 and 19 in the respective end blocks 14 and 16, and with a pair of nuts 21 and 22 threaded onto the respective opposite ends of each such tie rod 17, to maintain the discs 12 clamped axially together. As may be seen in FIG. 2, the tie rods 17 are preferably located radially outwardly of the outer edges of the discs 12.

A bore 23, formed by the axially aligned inner peripheries of the individual discs 12, may serve to define a pressure chamber within the pressure vessel 11, in combination with suitable end closing mechanisms. For example, where the pressure vessel is to be used in the extrusion of metallic products, such end closing mechanisms may constitute an axially aligned die assembly 24 and piston 26, located toward opposite axial ends of the bore 23. In such case, the piston 26 will be relatively movable within the bore 23 toward the die assembly 24.

Alternatively, a hollow, generally cylindrical liner tube 27, with an outer diameter substantially equal to the diameter of the bore 23, may be housed within the bore 23. The liner tube 27 must be located radially outwardly of the die assembly 24 and the piston 26 if these are employed as the end closing mechanisms for the pressure vessel 11. Such a liner tube 27 may be useful in assuring that the pressure vessel 11 is adequately sealed against any loss of high pressure fluid between the individual discs 12. An additional insert, in the form of a annulus formed by carbide segments (not shown), might also be utilized, in place of or in addition to the liner tube 27.

As thus far described, the pressure vessel 11 largely resembles prior art pressure vessel structures, e.g., the pressure vessel of the previously described Peterson patent. The pressure vessel 11 differs, however, from such prior art pressure vessels in the nature of the component discs 12, as well as in the manner of assembly of the pressure vessel 11, as will be described hereinafter.

Turning now to FIGS. 3 and 4 of the drawing, one of the discs 12 is illustrated in its condition prior to the assembly of the pressure vessel 11, i.e., in a normal, unstressed condition of the disc 12. The disc 12 is relatively thin, and has a normally dished, generally annular configuration, with a concave surface 28 facing away from a radial plane passing through the disc 12 along its inner periphery 29, such radial plane being represented by the center line 31 in FIG. 3. In addition, the disc 12 is flexible, due both to its relative thinness and to the nature of its material, which may, for example, be steel. The disc 12 is of a class generally referred to as Belleville springs or Belleville washers.

Referring next to FIG. 5 of the drawing, the manner in which the flexible discs 12 are preferably stacked or arrayed, during the assembly of the pressure vessel 11 and prior to the tightening of the nuts 21 on the tie rods 17, may be seen. The discs 12 are grouped in pairs 32, 33, 34, etc., of adjacent discs 12, with the concave surfaces 28 of each disc 12 of a pair facing one another. The various pairs 32, 33, 34, etc., of the discs 12 are arranged coaxially, in the previously described in-line array, with the radial planes 31 (FIG. 3) of the discs 12 all extending in parallel.

With the discs 12 initially arrayed as depicted in FIG. 5, and with the liner tube 27, if employed, disposed with the aligned inner peripheries 29 of the discs 12, the entire array is clamped together in the axial direction. Such clamping may be effected by tightening the nuts 21 (FIG. 1) on the opposite ends of the tie rods 17 so as to press the end blocks 14 and 16 axially toward one another. Alternatively, the discs 12 may be forced axially together, two at a time, by suitable tool mechanisms (not shown), after which the nuts 21 may be tightened. In either event, an axial compressive force is applied to the array of discs 12, flattening the flexible discs 12 into a substantially parallel-extending configuration, corresponding to the wall structure shown in FIG. 1, and thereby pre-stressing the discs 12 forming the configuration. The pre-stress pattern involves the creation of hoop compression stresses along the aligned inner peripheries 29 of the discs 12, which aligned inner peripheries 29 form the bore 23 of the pressure vessel 11, and the simultaneous creation of hoop tension stresses along the aligned outer peripheries of the discs 12. Such pre-stress pattern is particularly well adapted to permit the pressure vessel 11 to support very high fluid pressures within the bore 23.

The liner tube 27, if employed, will now be gripped firmly within the bore 23 of the pressure vessel 11 along the aligned inner peripheries 29 of the discs 12. Thus, the axially opposite ends of the interior of the liner tube 27, or of the bore 23 if no liner tube is employed, may now be closed by suitable end closing mechanisms, such as the previously described die assembly 24 and piston 26, in order to complete the assembly of the pressure vessel 11.

It is to be understood that the described pressure vessel, and the method for its assembly, are simply illustrative of preferred embodiments of the invention. In other embodiments, varied arrangements of the individual discs 12 might be utilized during assembly of the pressure vessel 11, as might be non-circular discs 12 and/or alternative disc clamping mechanisms. Many additional modifications might, of course, also be made in accordance with the principles of the invention.

What is claimed is:

1. A pressure vessel, comprising:
   a plurality of like, flexible, metallic, generally annular elements, each having, in an unstressed condition, a dished configuration including a concave surface facing away from a radial plane passing through the generally annular element along the inner periphery thereof, the generally annular elements forming an in-line array, extending in an axial direction, with the radial planes of the generally annular elements extending in parallel;
   means, effective to apply a compressive force to the array of generally annular elements in the axial direction, for clamping the generally annular elements together so as to maintain the generally annular elements in a flattened, substantially parallel-extending configuration, while pre-stressing the individual, generally annular elements forming the configuration; and means for closing the axially opposite ends of the array of generally annular elements.

2. A pressure vessel as set forth in claim 1, wherein said end closing means comprise:

a die assembly located toward one axial end of the array of generally annular elements within the bore formed by said array; and a piston located toward the opposite axial end of the array of generally annular elements and relatively movable within said bore toward and away from said die assembly.

3. A pressure vessel as set forth in claim 1, wherein said clamping means comprise:

two end members, each located at a different axial end of the array of generally annular elements and extending radially outwardly beyond the outer peripheries of the generally annular elements, the end members including at least one pair of axially aligned, axially extending apertures, the apertures of each pair being located, one in each of the end members, radially outwardly of the outer peripheries of the generally annular elements;

at least one axially extending member, each of which axially extending members passes through both of the axially aligned, axially extending apertures of each pair of apertures; and means, carried by each axially extending member, for forcing the end members axially toward one another.

4. A pressure vessel as set forth in claim 1, further comprising:

a hollow, generally cylindrical liner member disposed within the bore formed by said array of generally annular elements and having an outer diameter substantially equal to the diameter of said bore.

5. A pressure vessel as set forth in claim 4, wherein said end closing means comprise:

a die assembly located toward one axial end of the interior of said liner member; and a piston located toward the opposite axial end of the interior of the liner member and relatively movable within said interior toward and away from said die assembly.

6. A pressure vessel as set forth in claim 1, wherein each generally annular element comprises:

a flexible, metallic, generally annular element having, in an unstressed condition, a dished configuration including a concave surface facing away from a radial plane passing through the generally annular element along the inner pheriphery thereof, said concave surface including an outer periphery having all portions thereof substantially coplanar.

7. A pressure as set forth in claim 6, wherein said concave surface has a substantially circular outer periphery.

8. A method of forming a pressure vessel, comprising the steps of:

forming an array of like, flexible, metallic, generally annular elements, each having a dished configuration including a concave surface facing away from a radial plane passing through the generally annular element along the inner periphery thereof, said array of the generally annular elements constituting an in-line array, extending in an axial direction, and with the radial planes of the generally annular elements extending in parallel;

clamping the array of generally annular elements together in an axial direction so as to flatten the generally annular elements into a substantially parallel-extending configuration, while pre-stressing the individual, generally annular elements forming the configuration; and closing the axially opposite ends of the array of generally annular elements.

9. A method as set forth in claim 8, wherein said array forming step comprises:

forming said array with adjacent generally annular elements paired such that the concave surfaces of each generally annular element of a pair face one another.

10. A method as set forth in claim 8, wherein said closing step comprises:

providing a die assembly toward one axial end of the array of generally annular elements within the bore formed by said array; and providing a piston toward the opposite axial end of the array of generally annular elements, with the piston being relatively movable toward and away from the die assembly.

11. A method as set forth in claim 8, further comprising:

disposing a hollow, generally cylindrical liner member within the bore formed by said array of generally annular elements, the liner member having an outer diameter substantially equal to the diameter of said bore.

12. A method as set forth in claim 11, wherein said closing step comprises:

providing a die assembly toward one axial end of the interior of said liner member; and providing a piston toward the opposite axial end of the interior of the liner member, with the piston being relatively movable within said interior toward and away from the die assembly.

13. A method as set forth in claim 8, wherein said array-forming step further comprises:

forming said array with each component element thereof comprising a flexible, metallic, generally annular element having a dished configuration including a concave surface facing away from a radial plane passing through the generally annular element along the inner periphery thereof, said concave surface including an outer periphery having all portions thereof substantially coplanar.

14. A method as set forth in claim 13, wherein said array-forming step still further comprises:

forming said array with each component, generally annular element thereof having a substantially circular outer periphery about said concave surface thereof.

* * * * *

UNITED STATES PATENT OFFICE
CERTIFICATE OF CORRECTION

Patent No. 4,040,284        Dated August 9, 1977

Inventor(s) Francis J. Fuchs, Jr.

It is certified that error appears in the above-identified patent and that said Letters Patent are hereby corrected as shown below:

Title Page, Section entitled References Cited, U. S. Patent No. 3,278,993 to Brayman et al., dated October 18, 1966, should have been listed.

Signed and Sealed this

Fifteenth Day of November 1977

[SEAL]

Attest:

RUTH C. MASON
Attesting Officer

LUTRELLE F. PARKER
Acting Commissioner of Patents and Trademarks